(12) United States Patent
Eriksson

(10) Patent No.: US 7,782,860 B2
(45) Date of Patent: *Aug. 24, 2010

(54) ARRANGEMENTS FOR CONNECTION-ORIENTED TRANSPORT IN A PACKET SWITCHED COMMUNICATIONS NETWORK

(75) Inventor: Anders Eriksson, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 299 days.

This patent is subject to a terminal disclaimer.

(21) Appl. No.: 11/874,738

(22) Filed: Oct. 18, 2007

(65) Prior Publication Data

US 2008/0037559 A1    Feb. 14, 2008

Related U.S. Application Data

(62) Division of application No. 10/619,177, filed on Jul. 15, 2003, now Pat. No. 7,301,949.

(51) Int. Cl.
*H04L 12/28* (2006.01)
*H04L 12/56* (2006.01)
*H04L 12/66* (2006.01)
*H04J 3/16* (2006.01)
*H04J 3/22* (2006.01)

(52) U.S. Cl. .................. 370/392; 370/401; 370/352; 370/469

(58) Field of Classification Search .................. 37/389, 37/392, 401, 352, 469; 370/389, 392, 401, 370/352, 469
See application file for complete search history.

(56) References Cited

U.S. PATENT DOCUMENTS

| 6,151,324 | A | 11/2000 | Belser et al. |
| 6,449,279 | B1 | 9/2002 | Belser et al. |
| 7,088,717 | B2 | 8/2006 | Reeves et al. |
| 7,301,949 | B2 * | 11/2007 | Eriksson ............ 370/392 |
| 2001/0003526 | A1 | 6/2001 | Kanehara |
| 2002/0131414 | A1 | 9/2002 | Hadzic |

FOREIGN PATENT DOCUMENTS

| EP | 1 045 553 | 10/2000 |
| WO | WO 01/09700 | 11/2001 |

OTHER PUBLICATIONS

International Search Report for International Application No. PCT/SE2004/000992 dated Oct. 14, 2004.

(Continued)

*Primary Examiner*—Ronald Abelson
(74) *Attorney, Agent, or Firm*—Nixon & Vanderhye P.C.

(57) ABSTRACT

The present invention relates to a control system and communications systems that make it possible to transport traffic in a connection-oriented mode using the network infrastructure (30) and hardware of a traditionally connectionless network (34). According to the invention a traditionally connectionless network is complemented with a connection-oriented control plane (37). A subset (38b) of the address space (38) that in a connectionless network is used to define destination addresses is reserved for connection-oriented transport and is used to define path labels. An advantage of the invention is that an inexpensive Ethernet infrastructure (30) can be used for implementing a connection-oriented network (35).

25 Claims, 5 Drawing Sheets

OTHER PUBLICATIONS

U.S. Appl. No. 10/619,177, filed Jul. 15, 2003, Eriksson.

European Search Report for European Application No. 09162434.6—1249 dated Aug. 25, 2009.

E. Mannie et al., "Generalized Multi-Protocol Label Switching (GMPLS) Architecture," Aug. 2002, pp. 1-48.

"MPLS Based Transparent LAN Services" (published before filing of application, but exact publication date is unknown), pp. 1-10.

Martini et al., "Encapsulation Methods for Transport of Ethernet Frames Over IP/MPLS Networks," Aug. 2002, pp. 1-17.

Marc Lasserre, "Virtual Private LAN Services over MPLS", IETF Draft, "On Line" Jun. 24, 2003, XP002298951.

* cited by examiner

ARRANGEMENTS FOR CONNECTION-ORIENTED TRANSPORT IN A PACKET SWITCHED COMMUNICATIONS NETWORK

This application is a divisional of U.S. application Ser. No. 10/619,177, filed on Jul. 15, 2003, now U.S. Pat. No. 7,301,949, the contents of which are incorporated by reference.

FIELD OF THE INVENTION

The present invention relates to arrangements and methods for telecommunication and data communication in general and particularly to arrangements for providing connection-oriented communications on a traditionally connectionless network infrastructure.

BACKGROUND OF THE INVENTION

Ethernet is today by far the dominating local-area network (LAN) technology in the World. The term Ethernet refers to the family of network products covered by the IEEE 802.3 standard that defines what is commonly known as the CSMA/CD protocol (Carrier Sense Multiple Access Collision Detect protocol). Ethernet has many attractive features that have made it popular on the market:
  it is easy to understand, implement, manage, and maintain,
  it allows for low-cost network implementations,
  it provides extensive topological flexibility for network installation, and
  it guarantees successful interconnection and operation of standards-compliant products, regardless of manufacturer.

Of the listed features the relatively low cost of Ethernet network implementations is perhaps the primary reason for the popularity of Ethernet and since Ethernet is so dominating, components are mass-produced which further contributes to keeping costs down.

The Ethernet technology is increasingly being perceived as a candidate for future carrier-class metropolitan area networks (MAN) and wide-area networks (WAN). However, since the Ethernet technology is connectionless, it does not offer the traffic engineering, routing, protection, and quality of service (QoS) control that are supported by a connection-oriented technology such as Multi-Protocol Label Switching (MPLS).

A connectionless transport mode focuses on the destination address, or other identification, of data packets to be transported on a network, rather than any particular path between source and destination network elements. Ethernet's CSMA/CD protocol, the Internet protocol (IP), IPx and SNA are examples of protocols that use a connectionless mode of transportation. In connection-oriented mode signals are communicated over specified paths from a source network element to a destination network element. Examples of transport technologies that use connection-oriented transport are MPLS, Asynchronous Transfer Mode (ATM), Frame Relay, and packet-over-SONET.

A connection oriented network provides efficient bandwidth management, which enables traffic engineering and QoS control and thus allows for an operator to offer QoS aware services. Advantages of connectionless networks over connection-oriented networks are their simplicity, reliability and scaleability. Thus the connection-oriented and connectionless transport modes have different advantages and are thus differently suitable in different situations and for different types of services. However, since many network operators wish to offer their customers a wide variety of services or may wish to be flexible in terms of their types of offered services, there is a demand for the ability to use both modes of transport in the same network.

A number of solutions that combine connection-oriented and connectionless transport in the same network are known.

U.S. Pat. Nos. 6,151,324 and 6,449,279 describe a method and apparatus for providing connection-oriented switching in a communications network in order to achieve connection aggregation to reduce the total number of connections required between switches. This involves modifying connectionless packets so that they can be sent over a pre-established path between an ingress switch and an egress switch.

The international patent application WO 01/87000 describes a system and method for communicating connectionless and connection-oriented signals using common network elements. A signaling type of each signal is determined and a transport label that indicates the signal's signaling type is appended to each signal. The signals are then transported according to signaling procedures associated with each signal's signaling type.

The IETF draft "Generalized Multi-Protocol Label Switching (GMPLS) Architecture" of August 2002 presents a combination of connectionless and connection-oriented transport in a common network by outlining a standard for Ethernet over MPLS. This standard is based on the encapsulation of Ethernet frames in MPLS frames.

A common drawback of the prior art solutions discussed above is that the cost of implementing them are expected to be relatively high since they either require considerable modifications of standard network nodes or the use of legacy switching nodes that are specifically adapted for connection-oriented transport. Switching nodes for connection-oriented transport are relatively expensive compared to e.g. mass-produced Ethernet network nodes. According to the solutions presented in U.S. Pat. Nos. 6,151,324 and 6,449,279 and WO 01/87000 data packets to be transported are modified which implies that new modified network elements are required in order to implement these solutions. The encapsulation of Ethernet frames in MPLS frames as described in the above-mentioned IETF draft "Generalized Multi-Protocol Label Switching (GMPLS) Architecture" requires the use of relatively expensive legacy MPLS switching nodes.

SUMMARY OF THE INVENTION

Current connection-oriented technologies offer an adequate control plane for functions of traffic engineering, routing, protection, and QoS control. Unfortunately, the network nodes for implementing these current connection-oriented network technologies tend to be expensive due to relatively low production volumes. On the other hand, nodes for implementing connectionless network technologies, such as Ethernet network nodes, are relatively inexpensive due to high production volumes.

An object of the present invention is thus to provide arrangements that makes it possible to transport traffic in a connection-oriented mode using the network infrastructure and hardware of a traditionally connectionless network.

The arrangements according to the present invention complement a traditionally connectionless network with a connection-oriented control plane. According to a preferred embodiment a subset of the address space that in a connectionless network is used to define destination addresses is reserved for connection-oriented transport and is used to define path labels.

According to a first aspect of the present invention a control system is provided for controlling a packet switched communications network for forwarding data packets of a predetermined packet format. A set of addresses having a predetermined address format are assigned to the network and the network comprises a plurality of network nodes. The control system comprises a connectionless control plane for enabling and controlling connectionless transportation of data packets through the network, and a connection-oriented control plane for enabling and controlling connection-oriented transportation of data packets through the network. A first subset of the addresses is associated with the connectionless control plane and a second subset of the addresses is associated with the connection-oriented control plane. The connectionless control plane is arranged to control the operation of the network nodes such that a packet having an address belonging to the first subset is forwarded through the network by a connectionless transport mode, and the connection-oriented control plane is arranged to control the operation of the network nodes such that a packet having an address belonging to the second subset is forwarded through the network by a connection-oriented transport mode.

According to a second aspect of the present invention a packet switched communications system is provided, the communications system comprising a physical network infrastructure for forwarding data packets of a predetermined packet format. A set of addresses having a predetermined address format are assigned to the network infrastructure and the network infrastructure comprises a plurality of network nodes. The communications system further comprises a control system including a connectionless control plane for enabling and controlling connectionless transportation of data packets through the network infrastructure, and a connection-oriented control plane for enabling and controlling connection-oriented transportation of data packets through the network infrastructure. In addition the communications system comprises an address manager arranged to allocate a first subset of the addresses to the connectionless control plane, and a second subset of the addresses to the connection-oriented control plane. The connectionless control plane is arranged to control the operation of the network nodes such that a packet having an address that belongs to the first subset is forwarded through the network infrastructure by a connectionless transport mode, and the connection-oriented control plane is arranged to control the operation of the network nodes such that a packet having an address that belongs to the second subset is forwarded through the network infrastructure by a connection-oriented transport mode.

According to a third aspect of the present invention a packet switched communications system is provided, which system comprises an Ethernet network infrastructure for forwarding Ethernet frames based on the contents of a predetermined address field of the Ethernet frames. The network infrastructure comprises a plurality of network nodes and the communications system further comprises a control system including a connection-oriented control plane for enabling and controlling connection-oriented transportation of data packets through the Ethernet network infrastructure. A subset of the addresses of the address space of the predetermined address field are associated with the connection-oriented control plane in order to allow use of the addresses of the subset as path labels of connections established by the connection-oriented control plane. The connection-oriented control plane is arranged to control the operation of the network nodes such that a packet having an address that belongs to said subset in the predetermined address field is forwarded through the Ethernet network infrastructure by a connection-oriented transport mode.

An advantage of the present invention is that it makes it possible to use low cost switching hardware, such as Ethernet switches, for carrier-class networking. Existing Ethernet and IP hardware can be re-used by means of the present invention to provide carrier-class networking at low cost and with a high transport capacity. According to the present invention the traditionally connectionless Ethernet technology can be enhanced by complementing its current connectionless control plane with a connection-oriented control plane that makes it possible to support such features as traffic engineering, QoS control, resource management, and path protection. Thus the invention improves the position of the Ethernet technology relative to other MAN or WAN switching and cross-connect technologies such as ATM, SDH and MPLS.

Another advantage of the present invention is that it allows for operators to use connectionless and connection-oriented mode of transport in parallel on the same network infrastructure. This provides a large degree of flexibility to the operators in terms of network management and in terms of services that may be offered to clients.

Yet another advantage of the present invention is that it requires minor modifications of existing network hardware and that it is simple compared to other known solutions for combining connectionless and connection-oriented transport of signals in the same network.

An advantage of a preferred embodiment of the present invention is that it allows for simplistic management by combining the support for distributed self-configuration of the traditional Ethernet with automated management tools that configure the connection-oriented control plane according to the invention over standardized interfaces.

Further advantages and objects of embodiments of the present invention will become apparent when reading the following detailed description in conjunction with the drawings.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by one of skill in the art, the present invention may take the form of hardware embodiments, software embodiments or embodiments that combine software and hardware aspects.

The present invention is disclosed using flowchart illustrations and block diagrams. It will be understood that each block (of the flowchart illustrations and block diagrams), and combinations of blocks, can be implemented by computer program instructions. These program instructions may be provided to a processor circuit(s) within components of a network infrastructure, such that the instructions which execute on the processor circuit(s) create means for implementing the functions specified in the block or blocks. The computer program instructions may be executed by the processor circuit(s) to cause a series of operational steps to be performed by the processor circuit(s) to produce a computer implemented process such that the instructions which execute on the processor circuit(s) provide steps for implementing the functions specified in the block or blocks.

Accordingly, the blocks support combinations of means for performing the specified functions, combinations of steps for performing the specified functions and program instructions for performing the specified functions. It will also be understood that each block, and combinations of blocks, can be implemented by special purpose hardware-based systems which perform the specified functions or steps, or combinations of special purpose hardware and computer instructions.

Figure 1:
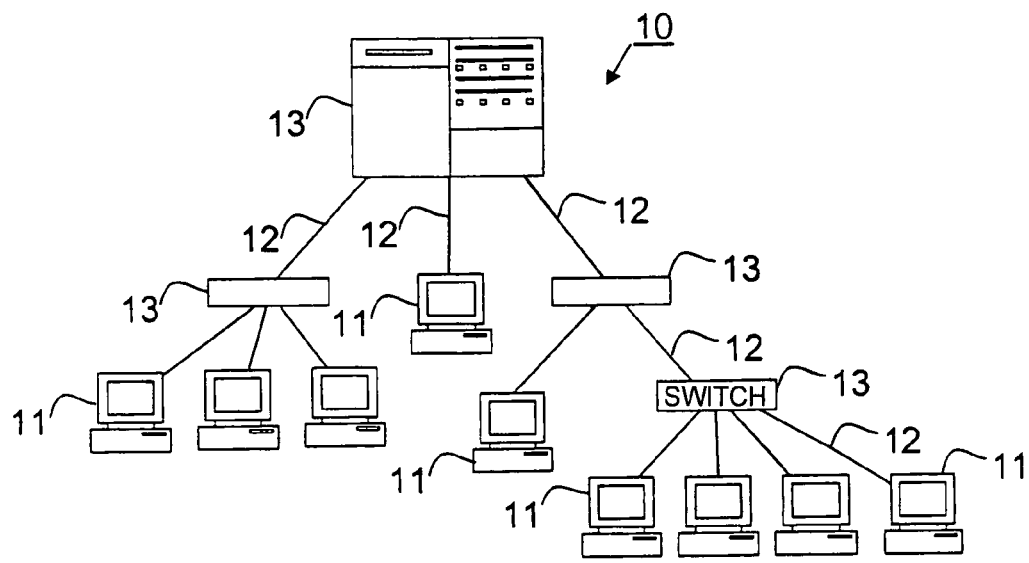
FIG. 1 is a schematic block diagram of a conventional switched Ethernet network.

In the first Ethernet implementations multiple stations were often connected in a bus configuration to a common segment formed by a coaxial cable. Modern Ethernet network use twisted pair wiring or fiber optics to connect stations in a radial pattern. Instead of using a shared medium for multiple stations it is today often replaced by switched Ethernet with a dedicated segment for each station. The dedicated segments connect to a switch, which may also be connected to other switches. An example of a switched Ethernet network 10 is illustrated in FIG. 1, wherein a number of stations 11 are connected by means of dedicated segments 12 to Ethernet switches 13. The Ethernet switches are arranged to pick up Ethernet frames from stations or other switches, and based on information in the frame forward each frame over an appropriate segment.

Figure 2:
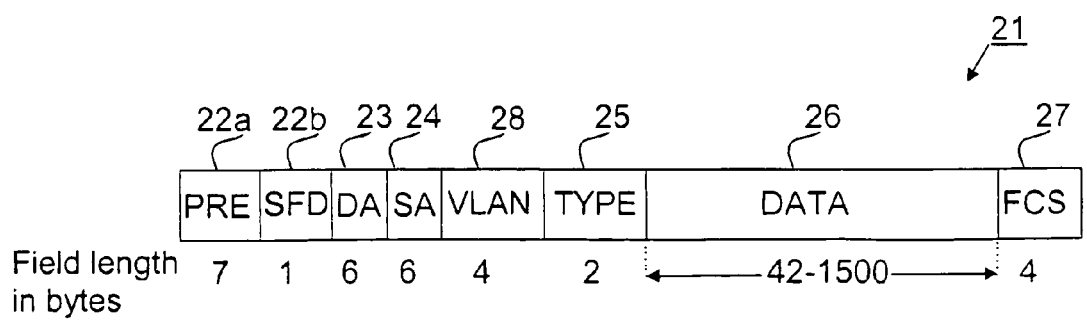
FIG. 2 is a schematic block diagram illustrating the format of a typical Ethernet frame.

In Ethernet networks the Media Access Control (MAC) sublayer is responsible for encapsulating data to be transmitted in frames that are assembled according to a specified Ethernet packet format. FIG. 2 illustrates the format of a typical Ethernet frame 21. The frame 21 comprises the following fields:

preamble 22a, consisting of 7 octets (bytes), which is an alternating pattern of ones and zeros that tells the receiving station that a frame is coming, start-of-frame delimiter 22b, consisting of 1 octet, which is the sequence 10101011 and indicates the start of a frame, destination address 23, consisting of 6 octets that identifies the station(s) which should receive the frame, source address 24, consisting of 6 octets that identifies the sending station, type 25, consisting of 2 octets, indicates the type of the frame being sent from among a number of optional frame types data 26, consisting of 42-1500 octets, contains the information data bits to be transmitted or received, frame check sequence 27, consisting of 4 octets, is a sequence of bits which is used to check for damaged frames.

The Ethernet frame 21 also comprises an additional optional field VLAN tag 28 of 4 octets which is used when creating virtual LANs based on Ethernet.

An Ethernet switch comprises a switching table that indicates on which of the switches' output ports a frame is to be output depending on the information in one or several of the frame's address fields. Usually frames are switched based on the contents of the destination address field, but many Ethernet switches also support switching based on the contents of other fields or combinations of fields, such as the source address field or the VLAN tag. In a traditional Ethernet network the switching tables are managed by a control plane, which makes it possible to transport frames in a connectionless transport mode.

The present invention provides a new connection-oriented control plane, which can operate on the Ethernet infrastructure in parallel with the traditional connectionless control plane and which can provide the Ethernet network with a connection-oriented transport mode. The connection-oriented control plane according to the invention may for instance be an MPLS-like control plane. By means of the connection-oriented control plane most of the MPLS features in the areas of traffic engineering, QoS, and path protection can be supported also in Ethernet networks.

The present invention allows for prior art Ethernet switching hardware to be used for transporting traffic in a connection-oriented mode, in parallel or instead of, the traditional connectionless mode of transport. The Ethernet switching hardware can be used without alterations for connection-oriented transport since the Ethernet frame does not need to be changed according to the present invention and switching is still based on the information in a predetermined field of the Ethernet frame, usually the destination address field. However, the present invention extends the semantic of this field by reserving a subset of the available address space for path labels. The new Ethernet path label is used for the same purpose as for instance an MPLS path label, i.e. to identify a connection-oriented label switched path. The path label works as the handle that enables the connection-oriented control plane to enhance the Ethernet technology by introducing a set of connection oriented features usually offered by MPLS and ATM.

Figure 3:
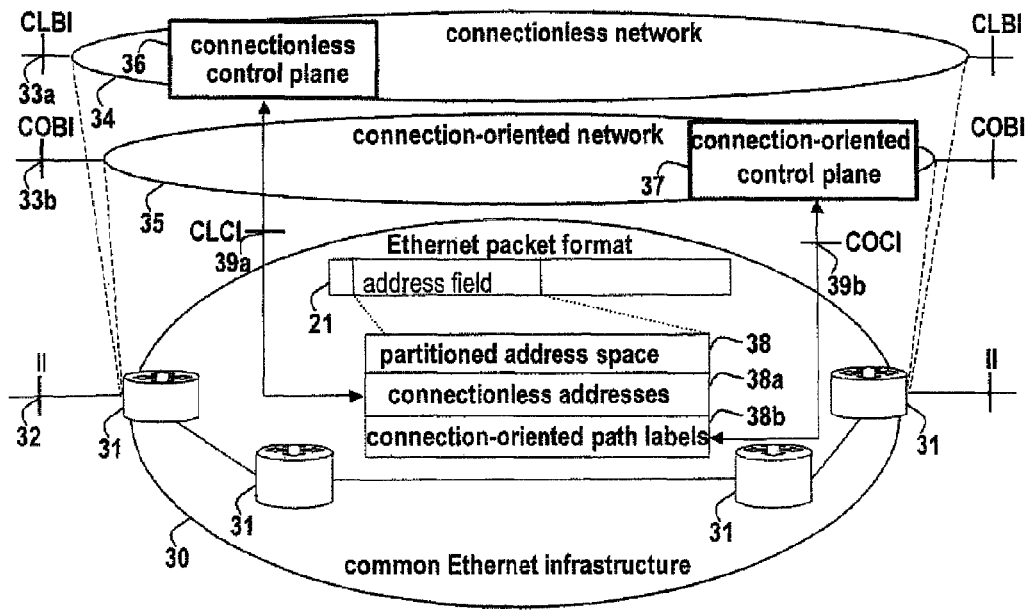
FIG. 3 is a schematic block diagram illustrating the principle of the present invention with two logical networks, one connectionless and one connection-oriented, implemented on a common Ethernet infrastructure.

FIG. 3 illustrates schematically a preferred embodiment and the principle of the present invention. The figure illustrates a common Ethernet infrastructure 30 including Ethernet switches 31 built with legacy Ethernet hardware, and edge routers that connect the Ethernet infrastructure to other infrastructures by means of infrastructure interfaces 32. According to the present invention both a connectionless network 34 and a connection-oriented network 35 can be implemented on the common Ethernet infrastructure 30. The connectionless network 34 functions as a traditional Ethernet network and is controlled by a connectionless control plane 36 and has a connectionless bearer interface (CLBI) 33a. The connection-oriented network 35 is controlled by a connection-oriented control plane 37 according to the present invention and has a connection-oriented bearer interface (COBI) 33b. FIG. 3 also schematically illustrates the Ethernet frame 21 which is used for transporting data in the Ethernet infrastructure. The same packet format is used irrespective of whether the frame is transported by means of connectionless transport mode in the connectionless network 34 or by means of connection-oriented transport mode in the connection-oriented network 35. Each frame 21 includes a destination address field 23, the contents of which determine how the Ethernet switches switch the frame.

The available Ethernet address space 38, i.e. the set of bit combinations that can be contained in the destination address field, is schematically illustrated in FIG. 3 and denoted by reference numeral 38. The available address space 38 is according to the present invention partitioned between the connectionless network 34 and the connection-oriented network 35. In other words a first subset 38a of the bit-combinations forms destination addresses that are associated with connectionless transport and a second subset 38b of the bit-combinations forms connection-oriented path labels that are associated with connection-oriented transport. The connectionless control plane 36 commands the first subset 38a of the address space 38 by means of a connectionless control interface (CLCI) 39a, while the connection-oriented control plane 37 commands the second subset 38b by means of a connection-oriented control interface (COCI) 39b, as will be explained in further detail hereinafter.

Figure 4:
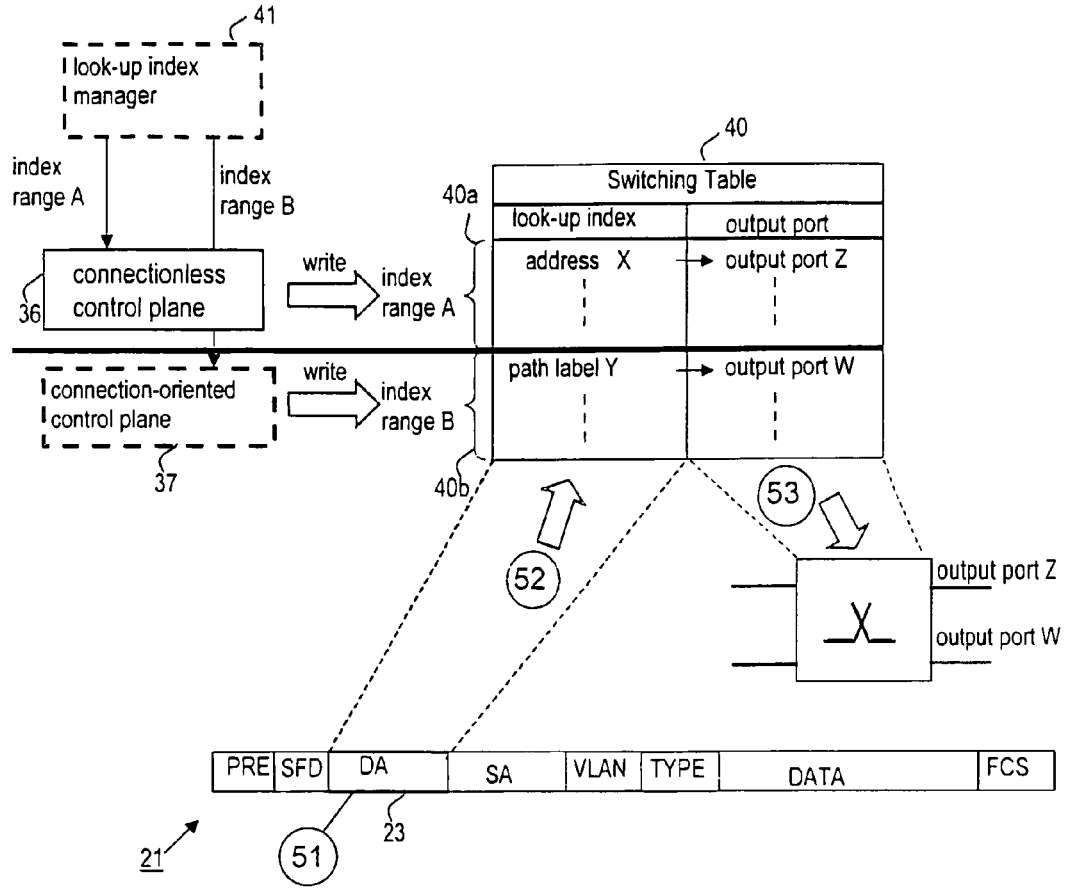
FIG. 4 is a schematic block diagram illustrating the relation between a connectionless control plane and a connection-oriented control plane as well as the switching procedure according to the present invention.

FIG. 4 is a schematic diagram which illustrates the switching procedure and relation between the connectionless and connection-oriented control planes 36, 37 of FIG. 3 in more detail. The content of the destination address field 23 of the Ethernet frame 21 is used as a look-up index to an entry in a switching table 40 of the Ethernet switch 31 that receives the frame. This entry stores the output switch port to which the Ethernet frame is to be forwarded. The control planes thus control the forwarding of the Ethernet frames by assigning an output port to each look-up index. In case of a connectionless frame, the look-up index is a traditional MAC address, and in case of a connection-oriented frame, the look-up index is a path label, for example an MPLS label.

A look-up index manager 41 allocates non-overlapping subsets 33a, 38b of the 48 bit address space 38 to the control planes 36, 37. Thereby each switching table 40 is separated in a connectionless area 40a and a connection-oriented area 40b. Each Ethernet frame 21 that is injected into the network is associated with a specific control plane that handles the transport service for the frame. The frame is also assigned a look-up index from the subset of the address space that has been allocated to the control plane. There is thus a one-to-one relation between a specific look-up index in the destination address field 23 of an Ethernet frame 21 and the specific control plane 36 or 37 that controls the corresponding entry in the switching table 40. This entry describes the switching action to be performed on the frame, i.e. forwarding to a specific output port.

Using the look-up index manager 41 according to the present invention, there is no need for any explicit information in the Ethernet frame regarding which control plane 36, 37 a specific frame is associated with. This information is implied by the look-up index in the Ethernet frame and the allocation of non-overlapping subsets of the 48 bit address space.

The dashed lines in FIG. 4 indicate the functional blocks that are needed in addition to the legacy Ethernet switching functions in order to implement the present invention. These blocks are the connection-oriented control plane 37 and the look-up index manager 41. These blocks would typically be implemented in software, thus allowing for re-use of legacy Ethernet hardware.

As mentioned above, no changes are required in the legacy Ethernet frame format. The only modification is the interpretation of the bit pattern in the destination address field 23: it is either interpreted as a traditional MAC address or as a path label, depending on which subset of the address space 38a, 38b it belongs to.

Figure 5:
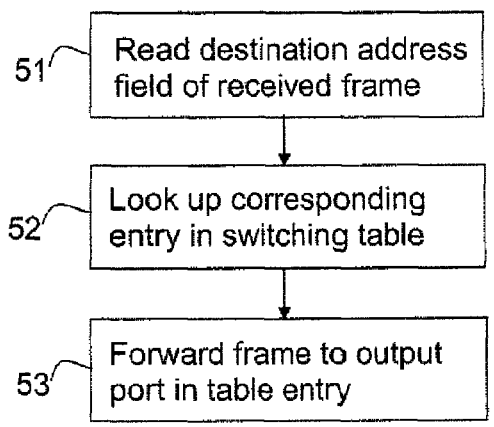
FIG. 5 is a flow diagram illustrating the switching procedure used for both connectionless and connection-oriented transport according to the present invention.

The switching action performed on an Ethernet frame 21 follows the procedure used in legacy Ethernet hardware, regardless of whether the frame is transported in a connectionless or connection-oriented manner. The procedure is outlined in FIGS. 4 and 5 as follows:

Step 51: Read the look-up index in the destination address field 23.

Step 52: Look up the corresponding entry in the switching table 40.

Step 53: Forward the frame to the output port in the switching table entry.

The procedure of writing entries in the switching table 40 is the same for the connection-oriented control plane 37 as for the traditional connectionless control plane 36. In both cases it is a matter of entering a 48 bit look-up index and the corresponding output port. Therefore, no changes are needed in the switching table hardware.

In the general case, the look-up index manager 41 can allocate non-overlapping subsets 38a, 38b of the address space 38 to an arbitrary number of control planes. For example, there could be several connection-oriented and connectionless control planes operating in parallel, each using separate routing protocols. In addition, there is no need for an allocated subset to consist of consecutive look-up indices.

In the embodiment shown in FIGS. 3 and 4 switching is based on the contents of the destination address field. If the hardware supports switching based on the contents of other fields such as the source address field 24 or VLAN tag 28, then the address space of these fields may be partitioned according to the present invention to allow for transportation of different packets with different transport modes. Thus if the hardware supports switching based on the source address field, then an alternative embodiment of the present invention may use the contents of the source address field to determine whether or not a frame is to be transported in a connectionless or a connection-oriented manner. The alternative embodiment functions in an analogous manner to the embodiment described in FIGS. 3 and 4 but switches based on the source address field instead of the destination address field and partitions the source address space instead of the destination address space.

Moreover, in the general case the switching action could depend on additional information in the Ethernet frame, such as VLAN identity and priority bits. The switching action would then also include forwarding to a specific output buffer corresponding to a specific priority level, and the forwarding would also depend on the VLAN configuration. To avoid interference between traffic belonging to different control planes, VLAN identities and priority levels should preferably be allocated in a non-overlapping manner to the different control planes in a fashion similar to the allocation of the address space.

IEEE has allocated the address space so that frames associated with the traditional globally unique MAC addresses will have "x0" as the first two of the 48 bits, while locally administered addresses will have "x1" as the first two bits, where x=0 in case of unicast communication and x=1 in case of multicast communication. Within the locally administered address space, the operator is free to allocate MAC addresses and path labels according to the scheme above.

However, if globally unique MAC addresses are used by the connectionless control plane, the addresses are hardwired in the Ethernet hardware and are thus beyond the control of the look-up index manager. To avoid overlapping, when allocating indices to the connection-oriented control plane 37, the look-up index manager 41 should instead use a subset of the locally administered address space. This address space is per definition non-overlapping with the globally administered addresses.

Assume that the address space is partitioned such that the first subset of addresses associated with the connectionless control plane comprises addresses where the second bit of a 48 bit sequence is 0, and the second subset associated with the connection-oriented control plane comprises addresses where the second bit of a 48 bit sequence is 1. Furthermore, assume that a switch receives a first packet where the destination address field reads "00 . . . " and corresponds to the destination address of a node in the network, and a second packet where the destination address field reads "01 . . . " and corresponds to a path label of a path set up by the connection-oriented control plane. Then the first packet will be transported in a connectionless manner and the second will be transported in a connection-oriented manner. The switch 11 forward both the first and second packet according to the same switching procedure as illustrated by the flow diagram of FIG. 5, but since the switch forwards the packets based on different entries in the switching table that are controlled by different control planes, the packets will be transported by different transport modes.

When the connection-oriented control plane sets up a path it will choose a path label from the subset of the address space reserved for path labels, assign the path label to the path, and determine the contents of the switching table entries associated with the path label in the switches along the path. Packets to be transported along the established path are then assembled with the path label contained in the destination address field.

The new Ethernet path label space 38b is assumed to be large enough to support labels that are unique per Ethernet domain. Label swapping can thereby be avoided, which is a requirement for re-use of existing Ethernet switching HW.

The present invention is preferably implemented by modifying current Ethernet switch software to introduce the connection-oriented control plane 37, which may be an MPLS-like control plane. As explained above the connection-oriented control plane 37 can control the Ethernet switching tables 40 in parallel with the connectionless control plane 36, since the connectionless control plane handles the entries that are associated with the first subset 38a of the address space, while the connection-oriented control plane handles the entries within the second subset 38b of the address space that is reserved for path labels. An Ethernet switch 31 can thus use both control planes in parallel, each control plane operating on its separate part of the Ethernet address space. A single physical Ethernet can therefore support two logical networks 34, 35. One is connectionless and uses traditional Ethernet addresses, and the other is connection-oriented and uses the address space, which according to the present invention is reserved for path labels.

From a control plane perspective, an Ethernet complemented with path labels would be similar to any other MPLS network. Thus if the connection-oriented control plane according to the present invention is based on a legacy MPLS control plane, only minor modifications would be required. However, a new control plane protocol must be introduced for the distribution of path label information between the Ethernet nodes. This protocol can be based on current MPLS protocols, such as the Label Distribution Protocol, or on GSMP (General Switch Management Protocol). Alternatively the connection-oriented control plane could be based on an ATM-like control plane.

The connection-oriented control plane could be implemented in a distributed fashion so that each Ethernet switch node processes routing control signaling messages from other nodes and handles the updating of the switching tables.

Figure 6:
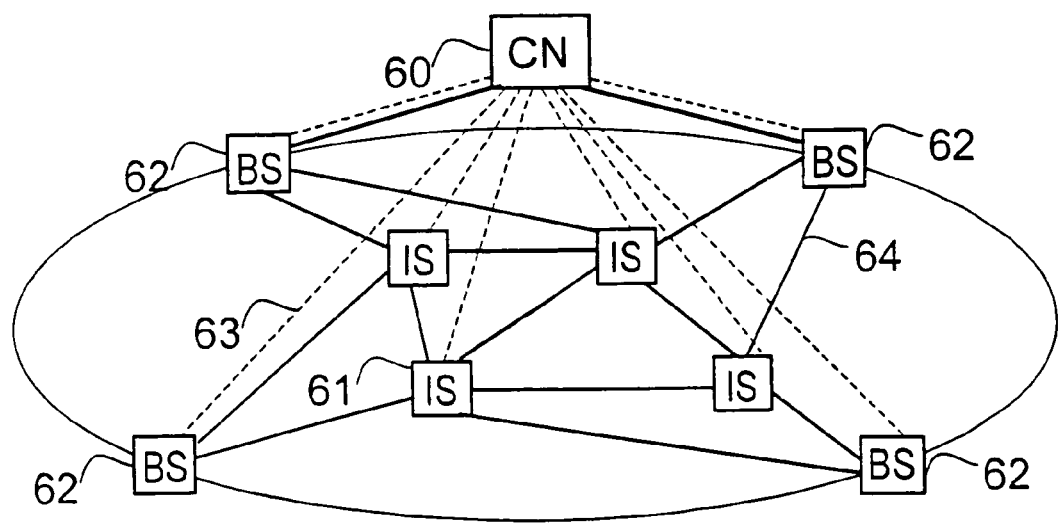
FIG. 6 is a schematic block diagram illustrating an embodiment of the present invention wherein the connection-oriented control plane is implemented in a separate control node (CN).

The connection-oriented control plane could also be implemented in a separate control node (CN) 60, as illustrated in FIG. 6. The control node would then communicate with all the switching nodes, both interior switches 61 and boundary switches 62 over the network infrastructure using the Connection-Oriented Control Interface (COCI) to update the switching tables. The COCI is a logical interface rather than a network interface. Logical links 63 over the COCI are illustrated with dashed lines in FIG. 6, while physical links 64 are illustrated with continuous lines. The embodiment shown in FIG. 6 allows for separation via the COCI of the basic forwarding functions implemented in the switching nodes 61, 62 from the network control functions located in the control node 60.

Communication between the control node and the Ethernet switches is needed to configure the connection-oriented network. This means that communication is needed before the communication paths of the connection-oriented network are established. This start-up problem of establishing communication for the initial configuration of the connection-oriented network can be solved by using a traditional self-configuring connectionless Ethernet implemented on the same physical infrastructure. Traditional connectionless Ethernet often comprise a function for distributed self-configuration of the network. It is thus advantageous if information regarding the network topology that has been gathered by the self-configuration function of the connectionless network could be utilized also by the connection-oriented network. If the connectionless network supports communication between the control node and the Ethernet switches, the control node can extract information from the switches about the network topology and link resources, in order to configure the connection-oriented paths. Thus a simplistic management can be obtained by combining the support for distributed self-configuration of the traditional Ethernet with automated management tools that configure the connection-oriented control plane over established control interfaces.

Figure 7:
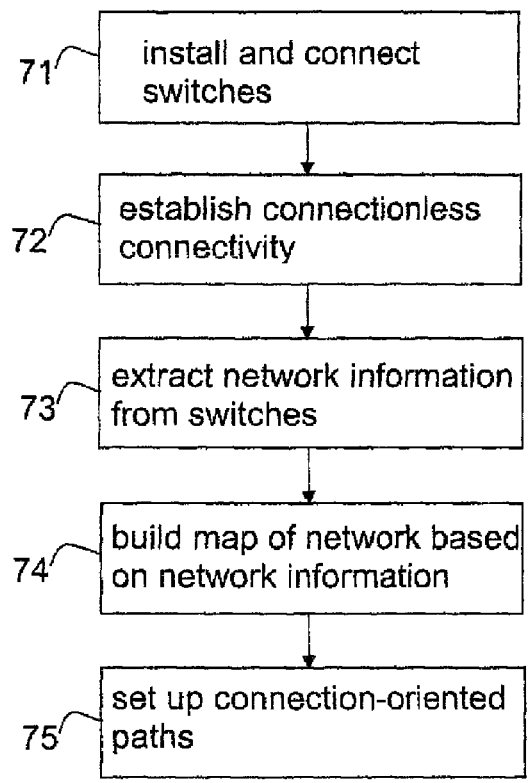
FIG. 7 is a flow diagram illustrating a method for configuring a network that operates according to the principles of the present invention.

FIG. 7 is a flow diagram that illustrates the steps involved in a preferred method of configuring a network which allows for both connectionless and connection-oriented transport according to the present invention. In a first step 71, the switches of the network are installed and interconnected. Connectionless connectivity is established in a step 72 based on prior art self-configuration support such as Ethernet self-learning switches and the Spanning Tree Protocol. Thereafter, connectionless connectivity is established between the control node and all the switches of the network in a step 73 and the control node extracts information from the switches about the topology and link resources of the connectionless network. In a further step 74, the control node builds a map of the network based on the information from the switches. Finally, in a step 75, the control node sets up the connection-oriented paths that e.g. correspond to Service Level Specifications (SLSs) sold by the operator. The set up of the connection-oriented paths is performed by the control node communicating with the switches using for instance GSMP to control the contents of the switching tables of the switches such that the switches will forward appropriate frames correctly along the connection-oriented paths. After the initial configuration, the control node may handle requests submitted by the operator for new paths associated with new SLSs. The control node keeps track of network resources that are already reserved for paths associated with active SLSs, and performs admission control by checking whether there are sufficient resources left for new SLSs.

It is worth noting that since a traditional Ethernet network lacks a routing protocol with a loop prevention mechanism the Spanning Tree protocol may, during configuration, disable some physical links for use by the connectionless network in order to prevent loops. However, if the connection-oriented network is provided with an appropriate loop prevention mechanism for the connection-oriented pats or if the control node has a complete overview of the network, the connection-oriented paths may use links that have been disabled for use by the connectionless network.

If the connection-oriented control plane is distributed to every switching node, existing Ethernet switch hardware may need an upgrade of the control processor capacity. The advantage of using a control code that handles most of the control processing is that this upgrade probably is not required. Existing Ethernet switches would then only need the minor modification of including support for the COCI, which preferably is implemented by means of modifying the switch software.

The reservation of an Ethernet address space for path labels may or may not become a standardization problem. An alternative solution would be to introduce a mechanism that detects the Ethernet addresses being used for traditional connectionless switching within the Ethernet network of interest. Addresses not in use can then be borrowed and used for path labels.

Embodiments of the present invention based on an Ethernet infrastructure have been described above. However the present invention is not limited to the Ethernet technology. The invention can also be applied to other connectionless protocols, such as IP. A connection-oriented control plane would then control path labels in a predetermined field of the IP packet such as the IP packet destination address field, and in the forwarding tables of the IP routers in a manner analogous to the Ethernet embodiments described above. This would enable connection-oriented IP packet transport in parallel with traditional connectionless IP routing, using the legacy IP packet format and using legacy IP routers with a modified control plane, A subset of the IP address space would then have to be reserved for path labels. The present invention can also be implemented based on other protocols for which it is possible to reserve a subset of an assigned address space for path labels.

A preferred embodiment of the present invention includes a connection oriented control plane that use a subset of the control plane for MPLS that includes the mechanisms involved in VPN configuration.

The basic mechanisms in MPLS use labels. If the connection oriented control plane according to the present invention is to be based on the MPLS control plane, then the concept for path labels used according to the present invention should be similar to the label concept for MPLS.

The generic MPLS label is a 32 bits long "shim" header encapsulating the payload. The label is unique within a certain context, e.g. link or VPN. Complex network structures can be built by stacking the headers in several label layers. The outermost label is used for selecting paths in a MPLS network. Normally there is a mesh of tunnels, called Label Switched Paths (LSPs), between all edge nodes in a provider's network. Each LSP is defined by the outermost MPLS virtual circuit label, which is switched at each Label Switched Router (tSR). It can be determined by routing protocols, e.g. OSPF, or traffic engineering protocols, e.g. RSVP-TE. The purpose of the mesh of LSPs is to create an overlay network, so that each PE-PE hop seems to be a one-hop connection.

Stacked labels can be used for trunking, when there are many LSPs between two nodes. The labels are attached to the stack with a push and pop mechanism, used where the LSPs are terminated. There can be many levels of trunking.

According to the present invention the destination address field in the Ethernet frame may e.g. be used as a path label, although this label is not swapped but switched within the network. To be able to use more than one label the destination address field can be split into several labels. However the destination address field is only 48 bits long. If all locally administered addresses are used for the connection oriented network according to the invention, then 46 bits are available, still containing a maximum of one MPLS label.

This can be solved by not using the generic MPLS label. The MPLS Architecture allows other definitions of the labels. The labels used according to the present invention can be defined with variable length depending on the context, e.g. a label only used for trunking may be very short, while a label used for VPN identification may be longer. Since the labels are not swapped when forwarding the frames, there is no need for standardizing any fixed length of the labels. The label lengths can be calculated and signaled between the edge nodes for each connection oriented path set up. In this way several labels can be stacked in the destination address field, although not an unlimited number.

There is a scalability issue involved when using stacked labels in an embodiment of the present invention based on an Ethernet infrastructure. Normally Ethernet forwarding is not aggregated, so labels cannot be used for trunking traffic. This means that there may be a lot of entries in the switching table of the Ethernet switches. This can be avoided by using a masking mechanism in the switch, which only looks at a part of the destination address field. Another alternative is to use the VLAN field of the Ethernet frame as a path label if the switching hardware supports switching based on the VLAN field.

The possibility of providing connection-oriented transport of traffic on a traditionally connectionless infrastructure achieved by the present invention is desirable in many different network applications. Some exemplary use cases of the present invention will be described in further detail hereinafter.

Figure 8:
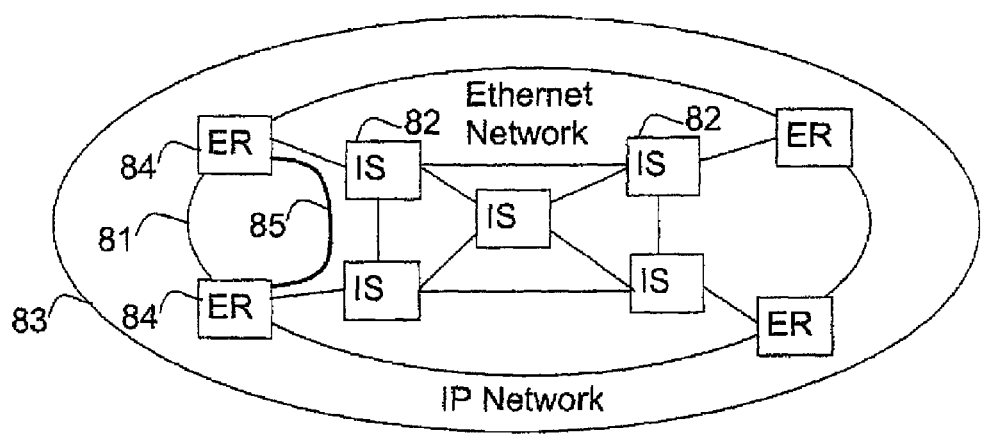
FIG. 8 is a schematic block diagram that illustrates a first basic use case of the present invention.

A basic use case of the present invention is shown in FIG. 8, which shows an Ethernet network 81 in which the present invention is implemented. The Ethernet network is according to the present invention controlled by both a connectionless control plane and a connection-oriented control plane which allows for both connectionless and connection-oriented transport of frames through the network as explained above. The Ethernet network 81 comprises a number of interior switches 82 and connects to a surrounding IP network 83 by means of edge routers 84. The present invention makes it possible to set up connection-oriented paths 83 edge-to-edge over the Ethernet network 81 to interconnect the edge routers 84. The connectionless connectivity of the Ethernet network 81 can be utilized for control signaling during the initial configuration of the connection-oriented paths 85. As mentioned above, the connectivity is preferably established by the traditional Ethernet self-configuration mechanisms. This facilitates the configuration compared with prior art connection-oriented networks where the control signaling channels either must be configured manually or utilize a dedicated meta-signaling mechanism.

Figure 9:
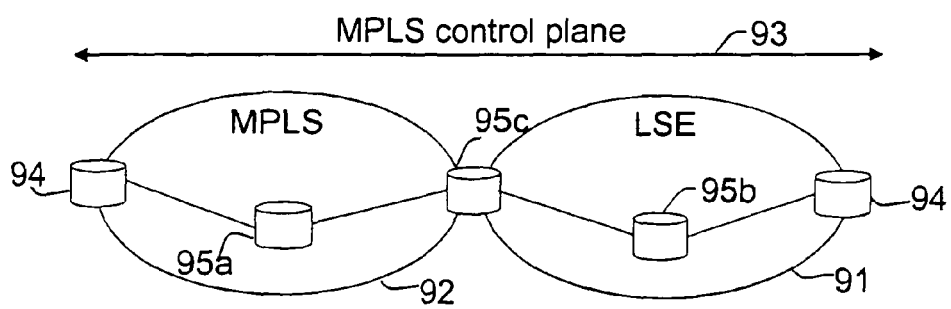
FIG. 9 is a schematic block diagram that illustrates a second use case of the present invention, which is for setting up Virtual Private Networks (VPNs).

A second use case of the present invention is to use it for setting up a VPN (Virtual Private Network). An operator may create tunnels between distant customer sites in order to create a VPN. The tunnels may be established by paths that are set up in a network that operates according to the principles of the present invention, which thus makes it possible to base the network on e.g. an Ethernet or IP infrastructure. The network that operates according to the principles of the present invention may be arranged to provide the same features as an MPLS network with regard to ability to carry different types of payload and tunnel different types of frames. Therefore such the network in which the present invention is implemented can be used to realize VPNs in the same way as any ordinary MPLS network. Since the connection-oriented control plane according to the present invention may be an MPLS-like control plane, it may be possible to set up VPNs across multiple domains using MPLS signaling as illustrated in FIG. 9. FIG. 9 shows a network 91 which is an Ethernet network which according to the present invention is complemented with a connection-oriented control plane to allow for connection-oriented transport over the network. This type of network is hereinafter called a Label Switched Ethernet (LSE) network. The LSE network 91 or the LSE domain is interconnected with an MPLS domain 92 according to prior art. A super-ordinate control plane 93 may be arranged which makes it possible to create VPNs across the MPLS and LSE domains 91 and 92. The super-ordinate control plane shall preferably not be aware if the nodes are MPLS or LSE nodes. In an arrangement such as shown in FIG. 9, edge routers 94 can be either of MPLS or LSE type. Interior switches between the edge routers 94 will either be an MPLS type switch 95a, an LSE type switch 95b or a bridge 95c with a MPLS interface on one side and an LSE interface on the other side. The bridge 95c is by the super-ordinate control plane 93 regarded as any ordinary interior switch in the network. The super-ordinate control plane 93 can also span multiple domains of the same type, e.g. multiple LSE domains.

Figure 10:
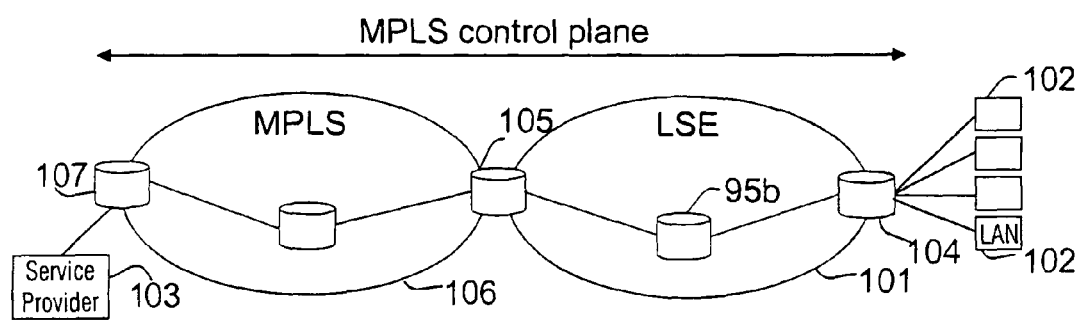
FIG. 10 is a schematic block diagram that illustrates a third use case of the present invention, which is for broadband access.

A third example of an application in which it may be advantageous to use the present invention is in a broadband access network 101 for connecting domestic LANs 102 to a content or service provider 103 as shown in FIG. 10. The broadband access network is here assumed to be an LSE network. The domestic LANs are connected to an access point 104 which is a LSE edge router that functions as a house aggregation node. In the access point there is a bridge between the domestic LANs and paths set up through the broad band access network 101 to an access edge node 105. Each path is a VPN to which each domestic LAN is mapped. Thus each domestic LAN 102 is connected to a separate VPN up to the access edge node 105. The access edge node 105 connects the broadband access network 101 to a provider backbone 106 which here is assumed to be an MPLS domain. It is furthermore assumed here that a number of content/service providers 103 are connected to edge routers 107 in the provider backbone 106. Each content/service provider has a path established from its edge router 107 to the access edge node 105. Within each such path between an edge router 107 and the access edge node 105 there are VPNs from the content/service providers 103 to the access edge node 105. An access provider can thus set up VPNs spanning all the way from the domestic LAN to the content/service provider. The advantage of making use of the present invention in the broadband access network is that the broadband access network can be based on fairly inexpensive hardware such as Ethernet hardware and still provide connection-oriented features, such as VPN features which are usually only afforded by more expensive hardware specifically adapted for connection-oriented applications.

From the description above it has become apparent that the present invention makes it possible to combine the best parts of the technologies for connectionless transport and connection-oriented transport by making it possible to use the low cost infrastructure of a traditional connectionless network for implementing a connection-oriented network that enables such features as traffic engineering, QoS control and path protection. Embodiments of the present invention enhance the Ethernet technology by complementing its current control plane with an MPLS-like control plane. A connection-oriented mode of Ethernet frame forwarding can thereby be supported in parallel with the traditional connection-less mode on the same legacy Ethernet infrastructure In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A network node for use in a packet switched communications system having
    a physical network infrastructure for forwarding data packets of a predetermined packet format, wherein:
    a set of addresses having a predetermined address format is assigned to the network infrastructure,
    the network infrastructure includes a plurality of network nodes,
    a first subset of said addresses is associated with a connectionless control plane enabling and controlling connectionless transportation of data packets through said network,
    a second subset of said addresses is associated with a connection-oriented control plane enabling and controlling connection-oriented transportation of data packets through said network, and the network node is arranged to:
        forward a packet having an address belonging to said first subset by a connectionless transport mode, and
        forward a packet having an address belonging to said second subset by a connection-oriented transport mode.

2. The network node according to claim 1,
    wherein the connectionless control plane is arranged to control the contents of a first portion of a switching table of the network node, which first portion relates to the first subset of addresses, and
    wherein the connection-oriented control plane is arranged to control the contents of a second portion of the switching table of the network node, which second portion relates to the second subset of addresses, thereby controlling a number of entries associating a number of said addresses with a respective output location of the network node enabling the network node to forward a packet to the output location associated with the address of the packet.

3. The network node according to claim 2, wherein the connectionless and connection-oriented control planes control the contents of the switching table of the network node by deciding which output port of the network node that is to be associated with which address in the switching table of the network node, thereby arranging for the outputting of packets by the network node to the output port that is associated, in the switching table of the network node, with the address of the packet.

4. The network node according to claim 1, wherein an address of said second subset of addresses represents a path label of a connection between the network node and a destination node or a path label of a connection between a source node and the network node established by the connection-oriented control plane.

5. The network node according to claim 1, wherein said packet switched communications network is an Ethernet network, said predetermined packet format is the format of an Ethernet frame and said predetermined address format is the format of one of a destination address field, a source address field or a VLAN tag of the Ethernet frame.

6. The network node according to claim 5, wherein said Ethernet network includes a self-configuration function for automatically configuring a connectionless network, and wherein said connection-oriented control plane configures a connection-oriented network in said Ethernet network based on network information derived by said self-configuration function.

7. The network node according to claim 1, wherein said packet switched communications network is an IP network, said predetermined packet format is the format of an IP packet and said predetermined address format is the format of an IP address.

8. The network node according to claim 1, wherein the connection-oriented control plane is based on an MPLS-like control plane.

9. The network node according to claim 1, wherein said connectionless and said connection-oriented control planes are implemented using computer-readable program instructions.

10. In a packet-switched communications network comprising a plurality of network nodes, a method of forwarding data packets of a predetermined packet format, wherein:
a set of addresses having a predetermined address format is assigned to the network,
a connectionless control plane enables and controls connectionless transportation of data packets through said network,
a connection-oriented control plane enables and controls connection-oriented transportation of data packets through said network, and
a first subset of said addresses is associated with the connectionless control plane and a second subset of said addresses is associated with the connection-oriented control plane, the method comprising:
forwarding a packet having an address belonging to said first subset through the network by a connectionless transport mode, and
forwarding a packet having an address belonging to said second subset through the network by a connection-oriented transport mode.

11. The method according to claim 10, wherein the connectionless control plane is arranged to control the contents of the first portion of a switching table of a network node, which first portion relates to a subset of addresses, and wherein the connection-oriented control plane is arranged to control the contents of a second portion of the switching table of the network node, which second portion relates to the second subset of addresses, the method further comprising:
controlling a number of entries associating a number of said addresses with a respective output location of the network node enabling the network node to forward a packet to the output location associated with the address of the packet.

12. The method according to claim 11, the method further comprising:
the connectionless and connection-oriented control planes controlling the contents of the switching table of the network node by deciding which output port of the network node that is to be associated with which address in the switching table of the network node, and
outputting the packets by the network node to the output port that is associated, in the switching table of the network node, with the address of the packet.

13. The method according to claim 11, wherein an address of said second subset of addresses represents a path label of a connection between the network node and a destination node or a path label of a connection between a source node and the network node established by the connection-oriented control plane.

14. The method according to claim 10, wherein said packet-switched communications network is an Ethernet network, said predetermined packet format is the format of an Ethernet frame and said predetermined address format is the format of one of a destination address field, a source address field or a VLAN tag of the Ethernet frame.

15. The method according to claim 14, wherein said Ethernet network includes a self-configuration function for automatically configuring a connectionless network, and wherein said connection-oriented control plane is arranged to configure a connection-oriented network in said Ethernet network based on network information derived by said self-configuration function.

16. The method according to claim 10 wherein said packet-switched communications network is an IP network, said predetermined packet format is the format of an IP packet, and said predetermined address format is the format of an IP address.

17. The method according to claim 10, wherein the connection-oriented control plane is based on an MPLS control plane.

18. The method according to claim 10, wherein at least one of said connectionless and said connection-oriented control planes is implemented in a control node that communicates with the network node using at least one signaling interface.

19. The method according to claim 10, wherein at least one of said connectionless and said connection-oriented control planes is distributed between the network nodes.

20. The method according to claim 10, wherein said connectionless and said connection-oriented control planes are implemented using computer-readable program instructions.

21. A control system for controlling a packet switched communications network for forwarding data packets of a predetermined packet format, wherein a set of addresses having a predetermined address format is assigned to the network and wherein the network comprises a plurality of network nodes, the control system comprising:
a connectionless control plane for enabling and controlling connectionless transportation of data packets through said network, and a connection-oriented control plane for enabling and controlling connection-oriented transportation of data packets through said network, wherein a first subset of said addresses is associated with the connectionless control plane and a second subset of said addresses is associated with the connection-oriented control plane, wherein the connectionless control plane is arranged to control the operation of the network nodes such that a packet having an address belonging to said first subset is forwarded through the network by a connectionless transport mode, and wherein the connection-oriented control plane is arranged to control the operation of the network nodes such that a packet having an address belonging to said second subset is forwarded through the network by a connection-oriented transport mode.

22. The control system of claim 21, wherein the connectionless control plane is arranged to control the contents of a first portion of a switching table of a network node, which first portion relates to a first subset of addresses, and wherein the connection-oriented control plane is arranged to control the contents of a second portion of the switching table of the network node, which second portion relates to a second subset of addresses, wherein said control system is arranged to control a number of entries associating a number of said addresses with a respective output location of said network node enabling the network node to forward a packet to the output location associated with the address of the packet.

23. The control system of claim 21, wherein the connectionless and connection-oriented control planes are arranged to control the contents of a switching table of the network node by deciding which output port of the network node that is to be associated with which address in the switching table, thereby arranging for the outputting of packets by the network node to the output port that is associated, in the switching table, with the address of the packet.

24. The control system according to claim 21, wherein an address of said second subset of addresses represents a path label of a connection between a source node and a destination node established by the connection-oriented control plane.

25. The control system according to claim 21, wherein said packet switched communications network is an Ethernet network, said predetermined packet format is the format of an Ethernet frame and said predetermined address format is the format of one of a destination address field, a source address field or a ULAN tag of the Ethernet frame and wherein said Ethernet network includes a self-configuration function for automatically configuring a connectionless network, and wherein said connection-oriented control plane is arranged to configure a connection-oriented network in said Ethernet network based on network information derived by said self-configuration function.

* * * * *

UNITED STATES PATENT AND TRADEMARK OFFICE
CERTIFICATE OF CORRECTION

PATENT NO.        : 7,782,860 B2
APPLICATION NO.   : 11/874738
DATED             : August 24, 2010
INVENTOR(S)       : Eriksson Page 1 of 1

It is certified that error appears in the above-identified patent and that said Letters Patent is hereby corrected as shown below:

In Column 3, Line 53, delete "infrastructure" and insert -- infrastructure for --, therefor.

In Column 6, Line 13, delete "types" and insert -- types, --, therefor.

In Column 7, Line 50, delete "33a," and insert -- 38a --, therefor.

In Column 9, Line 34, delete "11" and insert -- will --, therefor.

In Column 11, Line 24, delete "pats" and insert -- paths --, therefor.

In Column 11, Line 56, delete "plane," and insert -- plane. --, therefor.

In Column 12, Line 12, delete "(tSR)." and insert -- (LSR). --, therefor.

In Column 13, Line 1, delete "83" and insert -- 85 --, therefor.

In Column 18, Line 20, in Claim 25, delete "ULAN" and insert -- VLAN --, therefor.

Signed and Sealed this
Twenty-fifth Day of January, 2011

David J. Kappos
*Director of the United States Patent and Trademark Office*